(12) United States Patent
Gunawan et al.

(10) Patent No.: US 9,884,986 B2
(45) Date of Patent: Feb. 6, 2018

(54) METHOD OF USING BIOSURFACTANTS AS ACID CORROSION INHIBITORS IN WELL TREATMENT OPERATIONS

(71) Applicant: Baker Hughes Incorporated, Houston, TX (US)

(72) Inventors: Stanley Gunawan, Houston, TX (US); Mark A. Vorderbruggen, Spring, TX (US); Charles David Armstrong, Tomball, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 14/684,182

(22) Filed: Apr. 10, 2015

(65) Prior Publication Data
US 2016/0237334 A1 Aug. 18, 2016

Related U.S. Application Data

(60) Provisional application No. 61/982,117, filed on Apr. 21, 2014.

(51) Int. Cl.
*C09K 8/54* (2006.01)
*C09K 8/035* (2006.01)
*C23F 1/04* (2006.01)

(52) U.S. Cl.
CPC ............ *C09K 8/54* (2013.01); *C09K 8/035* (2013.01); *C23F 1/04* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 4,830,828 A * | 5/1989 | Anderson | C09K 8/54 210/698 |
| 5,879,913 A | 3/1999 | Marchal et al. | |
| 2004/0214795 A1 | 10/2004 | Gross et al. | |
| 2004/0242501 A1 | 12/2004 | Gross et al. | |
| 2007/0078068 A1 * | 4/2007 | Askew | C09K 8/34 508/428 |
| 2009/0186835 A1 | 7/2009 | Gross et al. | |
| 2009/0221455 A1 * | 9/2009 | Ke | C09K 8/54 507/261 |
| 2010/0300693 A1 | 12/2010 | Gray et al. | |
| 2016/0032161 A1 | 2/2016 | Campbell et al. | |

FOREIGN PATENT DOCUMENTS

| | | |
|---|---|---|
| EP | 1953237 A1 | 8/2008 |
| FR | 2855752 A1 | 2/2004 |
| WO | WO-2007/073371 A1 | 6/2007 |
| WO | WO-2007/130738 A1 | 11/2007 |

OTHER PUBLICATIONS

Ashby et al, "The Influence of Increasing Media Methanol Concentration on Sophorolipid Biosynthesis", Biotechnology Letters, 2010, 32 (10), pp. 1429-1437 (Abstract only).
U.S. Appl. No. 61/981,951, filed Apr. 21, 2014.
U.S. Appl. No. 61/981,964, filed Apr. 21, 2014.
Imura et al, "Enzymatic Conversion of Diacetylated Sophorolipid into Acetylated Glucoselipid", Journal of Oleo Science (2010), 59(9), pp. 495-501 (Abstact Only).
Fleurackers, "On the Production and Identification of Medium-Chained Sophorolipids". Eur. Journal of Lipid Science & Technology (2010), 112(6), pp. 655-662 (Abstract Only).
Ratsep et al, "Identification & Quantification of Sophorolipid Analogs", Journal of Microbiological Methods (2009), 78(3), pp. 354-356 (Abstract Only).
Fu et al, "Sophorolipids and their Derivatives are Lethal Against Human Pancreatic Cancer Cells," Journal of Surgical Resarch (2008), 148(1), pp. 78-82 (Abstract Only).
Shah, "Sophorolipids, Microbial Glycolipids with Anti-Human Immunodeficiency Virus & Sperm-Immo", Antimicrobial Agents & Chemotherapy (2005), 49(10), 4093-4100(Abstract Only).
DeKoster, "Tandem Mass Spectrometry & NMR Spectroscopy Studies of Candida bombicola Sophorolipids", Analytical Biochemistry (1995), 230(1), pp. 135-148 (Abstract Only).

* cited by examiner

*Primary Examiner* — John J Figueroa
(74) *Attorney, Agent, or Firm* — John Wilson Jones; Jones Delflache, LLP

(57) ABSTRACT

Corrosive effects arising during well treatment applications are inhibited and/or prevented by introducing into the well composition containing a corrosion inhibitor of a biosurfactant selected from glycolipids (other than sophorolipids and mannosylerythritol lipids), phospholipids; polyol lipids; lipoproteins, lipopeptides, ornithine lipids, carbohydrate-lipids, neutral lipids, aminoacid lipids, exolipids, liposan; siderolipids, protein polyamines diglycosyl diglycerides, fimbriae, saponified triglycerides and fatty acids. The composition may also contain a corrosion inhibitor intensifier.

20 Claims, No Drawings

METHOD OF USING BIOSURFACTANTS AS ACID CORROSION INHIBITORS IN WELL TREATMENT OPERATIONS

This application claims the benefit of U.S. patent application Ser. No. 61/982,117, filed on Apr. 21, 2014, which is herein incorporated by reference.

FIELD OF THE DISCLOSURE

The disclosure relates generally to the reduction of corrosion of metal alloys used during well treatment operations.

BACKGROUND OF THE DISCLOSURE

Tubulars within a wellbore are exposed to highly corrosive acidic conditions. Depending on the types of treatments and the nature of formation damage, the aqueous acidic solution can be hydrochloric acid (HCl), hydrochloric-hydrofluoric mud acid (HCl-HF), organic acids such as acetic acid and formic acid as well as combinations thereof.

For instance, in well stimulation operations, such as pickling, acid washing, matrix acidizing and acid fracturing, an aqueous acidic solution may be applied to the production zone in order to increase the size of the pores within the formation penetrated by the well and to provide enlarged passageways for hydrocarbon, water or steam. Such solutions may also be introduced into the well in order remove formation damage during well completions or subsequent workovers.

Corrosion may also be caused by treatment fluids (such as drilling fluids and completion fluids) having a high salt content.

Corrosion of metallic surfaces during well treatment operations is thus a prominent issue, as evidenced by surface pitting, embrittlement and loss of metal. Corrosion is exacerbated by elevated temperatures and pressures encountered in deeper formations. The cost of repairing or replacing corrosion-damaged casing, tubing, and other equipment in the wellbore is extremely high.

Various corrosion inhibitors for diminishing the corrosive effects on metal surfaces have been developed and used previously in well treatment operations. The types of corrosion inhibitors vary depending upon the nature of the compositions, the types of metal surfaces involved, associated environmental conditions, and the like. In some prior attempts to reduce corrosion by using corrosion inhibitors, various problems exist, such as high toxicity ratings or not being environmentally friendly. Some prior art corrosion inhibitors are also cationic, which makes them incompatible with various other acid treatment additives, such as with anionic anti-sludge agents.

A need exists for new and useful compositions for inhibiting or preventing corrosion during well treatment operations with safer, less toxic, and more environmentally acceptable compositions. It is also desirable for the compositions to be compatible with other additives that are used in acid treatments.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved compositions which inhibit corrosion and having one or more of the attributes or capabilities described or shown in, or as may be apparent from, the other portions of this patent.

SUMMARY OF THE DISCLOSURE

In an embodiment of the disclosure, a method of inhibiting corrosion during a well treatment operation is provided wherein a corrosive inhibiting effective amount of a biosurfactant is introduced into a well. The biosurfactant may be selected from glycolipids (other than sophorolipids and mannosylerythritol lipids), phospholipids; polyol lipids; lipoproteins, lipopeptides, ornithine lipids, carbohydrate-lipids, neutral lipids, aminoacid lipids, exolipids, liposan; siderolipids, protein polyamines diglycosyl diglycerides, fimbriae, saponified triglycerides and fatty acids.

In another embodiment of the disclosure, a method of treating an alloy surface during a well treatment operation is provided wherein an alloy surface is contacted with a treatment fluid. The treatment fluid contains an aqueous acidic fluid and a corrosion inhibitor selected from glycolipids (other than sophorolipids and mannosylerythritol lipids), phospholipids; polyol lipids; lipoproteins, lipopeptides, ornithine lipids, carbohydrate-lipids, neutral lipids, aminoacid lipids, exolipids, liposan; siderolipids, protein polyamines diglycosyl diglycerides, fimbriae, saponified triglycerides and fatty acids. liposan; siderolipids, protein polyamines diglycosyl diglycerides, fimbriae, saponified triglycerides and fatty acids. The amount of reduction in corrosion of the alloy surface is greater when the alloy surface is contacted with the corrosion inhibitor than when the alloy surface is only contacted with the aqueous acidic fluid.

In another embodiment of the disclosure, a method of inhibiting corrosion of a steel surface in contact with an acidic fluid during a well treatment operation is provided wherein the acidic fluid is contacted with a corrosion inhibitor and the steel surface is then contacted with the acidic fluid and corrosion inhibitor. The corrosion inhibitor may be selected from glycolipids (other than sophorolipids and mannosylerythritol lipids), phospholipids; polyol lipids; lipoproteins, lipopeptides, ornithine lipids, carbohydrate-lipids, neutral lipids, aminoacid lipids, exolipids, liposan; siderolipids, protein polyamines diglycosyl diglycerides, fimbriae, saponified triglycerides and fatty acids.

In another embodiment, a composition for use in the acid treatment of wells is provided which contains a corrosion inhibitor and a corrosion inhibitor intensifier in an acidic solution. The corrosion inhibitor may be a biosurfactant selected from glycolipids (other than sophorolipids and mannosylerythritol lipids), phospholipids; polyol lipids; lipoproteins, lipopeptides, ornithine lipids, carbohydrate-lipids, neutral lipids, aminoacid lipids, exolipids, liposan; siderolipids, protein polyamines diglycosyl diglycerides, fimbriae, saponified triglycerides and fatty acids.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . ."

The disclosure provides methods and compositions useful for protecting alloy surfaces exposed to acid during the servicing of a well utilizing an effective corrosion inhibitor, optionally with a corrosion inhibitor intensifier. Such surfaces may include, but not be restricted to, acid tanks, acid pumping equipment, blenders, metal tubulars, coiled tubing, etc. As such, alloy surfaces are protected from acidic fluids by use of the composition disclosed herein.

The corrosion inhibitors defined herein have low toxicity and are biodegradable. They can thus replace conventional corrosion inhibitors that are less environmentally friendly since they are equally effective in reducing corrosion rates of metal alloy surfaces. In an aspect, the corrosion inhibitor reduces the corrosion rate of an alloy surface to less than about 0.050 lb/ft$^2$, and in some cases less than 0.02 lb/ft$^2$.

The compositions of the present disclosure also provide a novel solution for effectively reducing the toxicity and environmental impact of many acid well stimulation treatment fluids, such as those that use hydrochloric acid. As yet another advantage, the corrosion inhibitors in the disclosure may be applied in such environments where the use of cationic acid corrosion inhibitors causes an incompatibility problem with acid additives, such as anti-sludging agent.

The corrosion inhibitor for use in the disclosure is a biosurfactant. As used herein, the term biosurfactant shall refer to a surfactant obtained from a natural source (plant, animal or microbial cell). The biosurfactants for use in the method disclosed herein may be derived through fermentation or may be manufactured.

In a preferred embodiment, the biosurfactant is a glycolipid (other than sophorolipids and mannosylerythritol lipids).

Preferred glycolipids include rhamnolipids, such as those containing one or two rhamnose units, linked glycosidically to a 3-hydroxy acid, such as the mono-rhamnolipid of (I A) and the di-rhamnolipid of (I B) illustrated below:

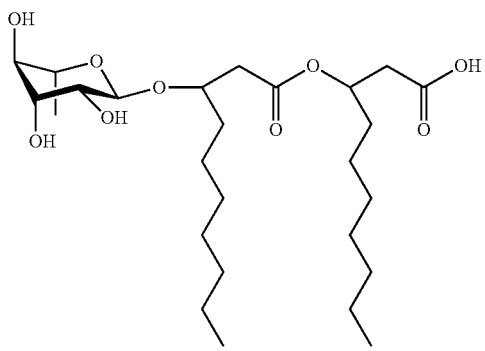

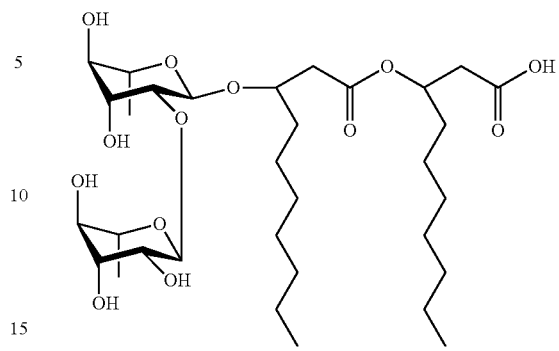

Other preferred glycolipids include cellobiose lipids such as those consisting of the disaccharide cellobiose linked O-glycosidically to the ω-hydroxyl group of the fatty acid 15,16-dihydroxyhexadecanoic acid or 2,15,16-trihydroxyhesxadecanoic acids. Others of the hydroxyl groups may be esterified either to acetate or a medium-chain 3-hydroxy fatty acid. Representative cellobiose lipids are set forth in (II):

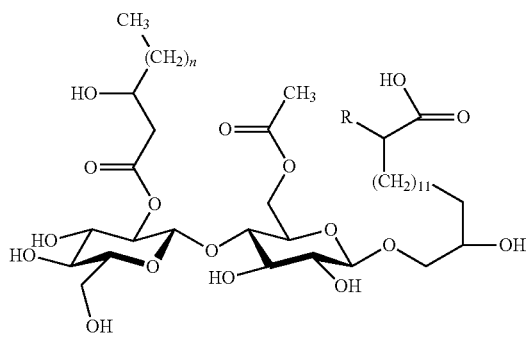

where R is —H or —OH and n is 2 to 4.

Other suitable glycolipids include trehalose such as those non-reducing disaccharides in which the two glucose units are linked in an α,α-1,1-glycosidic linkage. Representative trehaloses include trehalose 6,6'-dimycolate of the formula (III):

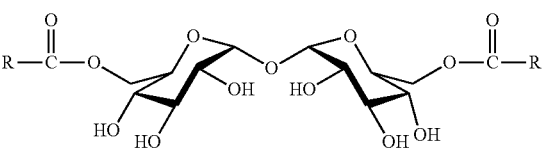

where RCO is mycoloyl. Other suitable trehalose lipids are acylated trehaloses with various fatty acids attached to the 2- and 3-hydroxyl groups of the same glucose. These fatty acids include n-C$_{16-19}$ saturated fatty acids, C$_{21-25}$ α-methyl branched fatty acids and C$_{24-28}$ α-methyl branched, β-hydroxy fatty acids.

Other glycolipids include lipopolysaccharides or lipoglycans. Exemplary lipopolysaccharides are emulsans such as those consisting of a trisaccharide backbone of D-galactosamine, D-galactosaminouronic acid and a deoxyaminohexose to which $C_{10-22}$ fatty acid groups are linked via ester and amide bonds. Exemplary emulsans include those of formula (IV):

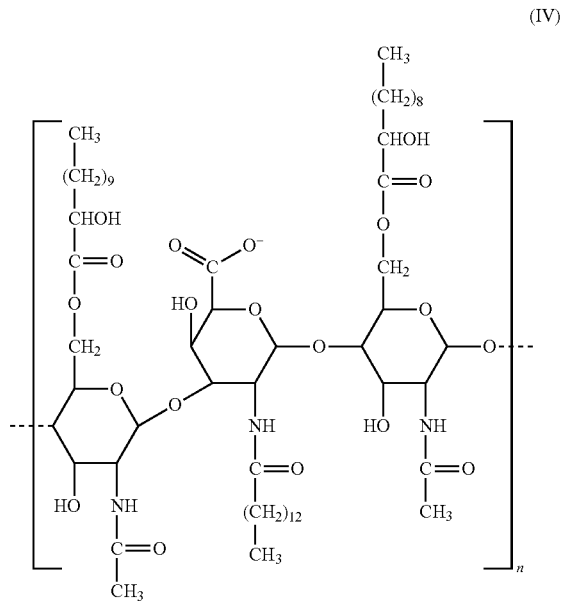

having an approximate molecular weight of 1,000 kDa.

Other suitable glycolipids include alasans which may be isolated from the same bacterial genus as emulsans.

Other lipids may also be used as suitable corrosion inhibitor agents within the disclosure. Exemplary lipids may include phospholipids; polyol lipids; lipoproteins such as surfactin and iturin; lipopeptides such as viscosin and lichenysins; ornithine lipids such a lyso-ornithine lipid with a second fatty acyl group ester-linked to the 3-hydroxy position of the first fatty acyl group; carbohydrate-lipids; neutral lipids; aminoacid lipids; exolipids such as serrawettin; liposan; phospholipids; and siderolipids (flavolipids) such as those containing citric acid and cadaverine molecules.

In addition, the corrosion inhibitors for use in the disclosure herein may include protein polyamines such as a protease enzyme like subtilisin, diglycosyl diglycerides, and fimbriae and other vesicles.

Other preferred biosurfactants for use in the disclosure are saponified triglycerides. In a preferred embodiment, the saponified triglyceride is a triglyceride of a $C_8$-$C_{18}$ fatty acid and includes triglycerides of tall oil, stearic acid, lauric acid, palmitoleic acid, oleic acid, linoleic acid, castor oil, caprylic and arachidic acid. Further, fatty acids may be useful as the biosurfactant in the disclosure including $C_8$-$C_{18}$ fatty acids. Longer chain fatty acids, such as mycolic acid, may also be used.

The corrosion inhibitors disclosed herein are especially useful in well treatment operations since the corrosive effect of acid on metal, in the presence of the inhibitor, is greatly minimized and in some cases prevented. The treated well may be a hydrocarbon producing well, such as a gas or oil well, or non-hydrocarbon producing wells, such as water injection wells, water producing wells or geothermal wells.

Exemplary metals include iron, ferrous base metals, alloys of steel, alloys of nickel, coiled tubing, corrosion resistant alloys, or duplex steels. Alloys of steel can include stainless steel, chrome steel, martensitic alloy steel, ferritic alloy steel, carbon steel, precipitation-hardened stainless steels and the like. Corrosion resistant alloys can also include chromium and the like. Other suitable types of alloy surfaces that the methods and compositions described herein can be used on will be apparent to those of skill in the art and are to be considered within the scope of the present disclosure.

The corrosion inhibitor introduced into the aqueous acid fluid may be from 4 to 100% active.

The fluid containing the corrosion inhibitor may be introduced into various types of aqueous acidic fluids. For example, the aqueous acidic fluid can include hydrochloric acid, hydrochloric-hydrofluoric acid, acetic acid, formic acid, citric acid, phosphonic acid, methanesulfonic acid, or combinations thereof. Other types of acids that can be used in the aqueous acidic fluids will be apparent to those of skill in the art.

A corrosion inhibitor intensifier may also be included along with the corrosion inhibitor to boost the corrosion prevention power of the corrosion inhibitor, particularly at elevated temperatures. The use of the combined corrosion inhibitor and the optional corrosion inhibitor intensifier may substantially reduce the amount of corrosion and rate of corrosion experienced by the alloy surface compared to using the same fluid without the corrosion inhibitor alone or in combination with the corrosion inhibitor intensifier.

Suitable corrosion inhibitor intensifiers may include formic acid, sodium formate, potassium formate, methylformate, ethylformate, sodium iodide, potassium iodide, copper iodide, molecular iodide, metal oxides, or combinations thereof. Other suitable corrosion inhibitor intensifiers will be apparent to those of skill in the art and are to be considered within the scope of the present disclosure.

Besides the compositions described herein, other components commonly used in acidizing compositions may be used to broaden the range of applications in which the compositions defined herein may be used, so long as the components are compatible with the methods and compositions described herein. For example, mutual solvents or alcohols (such as methanol or isopropanol), surfactants, sequestering agents, friction reducers, iron control agents, non-emulsifiers, foaming agents, water-wetting surfactants, anti-sludge agents, gelling agents, bactericides, clay stabilizer or fluid loss control agents, and the like can be used in the present disclosure. The amount of such additives, when employed, is typically between from about 0.1 to about 2 weight percent. When mutual solvent or alcohols are employed, they are typically used in amounts between from about 1 to about 20 weight percent of the well treatment composition. Other suitable compatible components and amounts will be apparent to those of skill in the art and are to be considered within the scope of the present disclosure.

The corrosion inhibitors inhibit or prevent corrosion caused by aqueous acids and further reduce corrosion rates of various types of alloy surfaces. The aqueous acid may be composed of mineral acids, such as hydrochloric acid, hydrofluoric acid, sulfuric and phosphoric acids as well as weak acids, such as formic acid, acetic acid hydroxyacetic acid and propionic acid as well as mixtures of such acids.

The aqueous acidic fluid containing the corrosion inhibitor and, optionally, corrosion inhibitor intensifier, is typically introduced through the alloy surface or conduit positioned within the well. The amount of inhibitor introduced into the well may be dependent on the corrosive aqueous acid system, temperature and intended time of contact. In an aspect, the amount of corrosion inhibitor in the aqueous acidic fluid is between from about 0.1 vol. % to about 50 vol. %, preferably between from about 0.1 to about 15 vol. %. When the corrosion inhibitor intensifier is added to the composition, the composition can comprise about 2 pounds per thousand gallons (pptg) to about 100 pptg corrosion inhibitor intensifier; or alternatively, from about 5 pptg to about 35 pptg.

The corrosion inhibitor, and optionally corrosion inhibitor intensifier, can be used for various types of treatments for applications that occur in or before the wellbore and in subterranean formation applications. In an embodiment, the method may be performed by introducing an effective corrosion inhibiting or preventative amount of the inhibiting compound into a corrosive aqueous acid prior to its introduction into a targeted well.

The use of the corrosion inhibitor is particularly effective in the treatment of wells for enhancement of production of the well such as well stimulation processes like matrix acid stimulation and acid fracturing, acid tunneling, scale treatment, coiled tubing application, or damage removal. In another embodiment, the fluid is used during pickling a tubular.

In a preferred embodiment, the corrosion inhibitor may be used to effectively prevent corrosion during the acid treatment of wells, particularly at high temperatures. In such applications, the treatment provides enlarged passageways for hydrocarbons, water, or steam to move to collection points that would otherwise be obstructed. The fluid may be used in a wide variety of temperatures. In an aspect, for example, the corrosion inhibitor can be used in temperatures of up to about 225° F. For temperatures above 225° F., the corrosion inhibitor intensifier increases the corrosion prevention strength of the corrosion inhibitor. For temperatures that range from about 225° F. to about 350° F., the treatment fluid comprises the corrosion inhibitor and the corrosion inhibitor intensifier. The methods and compositions comprising both the corrosion inhibitor and the corrosion inhibitor intensifier are suitable for applications of up to about 350° F.

Other types of treatment applications that the methods and compositions described herein can be used will be apparent to those of skill in the art and are to be considered within the scope of the present disclosure.

All percentages set forth in the Examples are given in terms of volume units except as may otherwise be indicated.

EXAMPLES

Corrosion tests were performed at 175° F., 200° F. and 225° F. on two different types of steel, carbon steel (N-80) and 13% chromium steel (Cr-13). The acidic fluids tested were acetic acid, formic acid and HCl with KI. The results of the corrosion tests are shown in Tables I-V. In each of the tests the acid solution was applied to the two different types of steel for six hours. The comparison runs did not use corrosion inhibitor or KI. A rhamnolipid and a non-ionic surfactant were tested with different acid systems (10% acetic acid, 10% formic acid, and 5-10% HCl) at 175° F.-200° F. for their efficacy as green acid corrosion inhibitors. Synergistic contributions between two biosurfactants and biosurfactants with conventional corrosion inhibitors were also tested. The targeted corrosion rate is was ≤0.05 lb/sq ft.

As used below, the following abbreviations have been used:

CI-31, CI-111, CI-27: conventional corrosion inhibitors which are not environmentally friendly. CI-31 and CI-111 were used as acid corrosion inhibitor standards for organic acid experiments (10% acetic acid and 10% formic acid) and CI-27 was used as an acid corrosion inhibitor standard for 5-15% HCl experiments.

SC-1000, a non-ionic surfactant comprised of fatty alcohols, free fatty acids and fatty esters, 13% active, commercially available from Gemtek;

Rhamnolipid, a rhamnolipid biosurfactant commercially available from Agae Technologies.

TABLE I

10% Acetic Acid at 175° F. for 6 hours

| | | | | | | Metal | Conversion Factor | Type |
|---|---|---|---|---|---|---|---|---|
| | | | | | | 1 | N-80 | 0.0739 |
| | | | | | | 2 | Cr-13 | 0.0709 |
| | | KI, | | | | Weights | Corrosion Rate | |
| Ex. | Volume | mM | Metal | Inhibitor | Conc. | Initial | Final | Lbs/Sq Ft | Pitting |
| Comp 1 | 100 | 12.05 | 1 | — | — | 38.9108 | 36.6633 | 0.1661 | Trace |
| 2 | 100 | 12.05 | 1 | SC-1000 | 0.10% | 36.3583 | 36.2067 | 0.0105 | |
| 3 | 100 | 12.05 | 1 | Rhamnolipid | 5.50% | 38.0433 | 37.9356 | 0.0080 | 0 |
| 4 | 100 | 12.05 | 1 | CI-31 | 0.50% | 37.1918 | 37.1361 | 0.0041 | 0 |
| 5 | 100 | 12.05 | 1 | CI-111 | 0.50% | 37.1028 | 37.039 | 0.0047 | 0 |
| Comp 6 | 100 | 12.05 | 2 | — | — | 39.5298 | 39.368 | 0.0115 | 0 |
| 7 | 100 | 12.05 | 2 | SC-1000 | 0.10% | 41.6017 | 41.4842 | 0.0084 | 0 |
| 8 | 100 | 12.05 | 2 | Rhamnolipid | 5.50% | 39.4118 | 39.3179 | 0.0067 | 0 |
| 9 | 100 | 12.05 | 2 | CI-31 | 0.50% | 37.9245 | 37.8702 | 0.0038 | 0 |
| 10 | 100 | 12.05 | 2 | CI-111 | 0.50% | 39.151 | 39.866 | 0.0035 | 0 |

TABLE II

10% Acetic Acid at 200° F. for 6 hours

| | | | | Metal | Conversion Factor Type | |
|---|---|---|---|---|---|---|
| | | | | 1 | Cr-13 | 0.0716 |
| | | | | 2 | N-80 | 0.0738 |

| Ex. | Volume | KI, mM | Metal | Inhibitor | Conc. | Weights Initial | Final | Corrosion Rate Lbs/Sq Ft | Pitting |
|---|---|---|---|---|---|---|---|---|---|
| Comp 11 | 100 | — | 1 | — | — | 39.5536 | 39.3671 | 0.0134 | 0 |
| 12 | 100 | 12.05 | 1 | SC1000 | 0.20% | 38.0084 | 37.8479 | 0.0115 | 0 |
| 13 | 100 | 12.05 | 1 | Rhamnolipid | 2.20% | 39.8204 | 39.6798 | 0.0101 | 0 |
| 14 | 100 | — | 1 | CI-31 | 0.20% | 38.6053 | 38.5193 | 0.0062 | 0 |
| 15 | 100 | — | 1 | CI-111 | 0.20% | 40.4387 | 40.3577 | 0.0058 | 0 |
| Comp 16 | 100 | — | 2 | — | — | 38.5817 | 34.8135 | 0.2781 | 0 |
| 17 | 100 | 12.05 | 2 | SC1000 | 2.00% | 37.6309 | 37.386 | 0.0181 | 0 |
| 18 | 100 | 12.05 | 2 | Rhamnolipid | 11.00% | 38.224 | 38.0622 | 0.0119 | 0 |
| 19 | 100 | — | 2 | CI-31 | 0.20% | 38.1505 | 38.0483 | 0.0075 | 0 |
| 20 | 100 | — | 2 | CI-111 | 0.20% | 38.5402 | 38.481 | 0.0044 | 0 |

TABLE III

10% Formic Acid at 175° F. for 6 hours

| | | | | Metal | Conversion Factor Type | |
|---|---|---|---|---|---|---|
| | | | | 1 | N-80 | 0.0712 |
| | | | | 2 | Cr-13 | 0.0701 |

| Ex. | Volume | KI, mM | Metal | Inhibitor | Conc. | Weights Initial | Final | Corrosion Rate Lbs/Sq Ft | Pitting |
|---|---|---|---|---|---|---|---|---|---|
| Comp 21 | 100 | — | 1 | — | — | 36.7532 | 33.4711 | 0.2337 | 1 |
| 22 | 100 | 12.05 | 1 | SC-1000 | 0.50% | 38.5902 | 38.2259 | 0.0259 | 0-Trace |
| 23 | 100 | 12.05 | 1 | SC-1000 | 2.00% | 40.3506 | 40.1842 | 0.0119 | 0-Trace |
| 24 | 100 | 12.05 | 1 | Rhamnolipid | 5.50% | 36.427 | 36.1507 | 0.0201 | 0 |
| 25 | 100 | — | 1 | CI-31 | 0.50% | 36.7947 | 36.5881 | 0.0147 | 0-Trace |
| 26 | 100 | — | 1 | CI-111 | 0.50% | 38.6615 | 38.5782 | 0.0059 | 0 |
| Comp 27 | 100 | — | 2 | — | — | 39.3884 | 35.4549 | 0.2757 | 0 |
| 28 | 100 | 12.05 | 2 | SC-1000 | 2.00% | 40.5277 | 39.9507 | 0.0404 | 0 |
| 29 | 100 | 12.05 | 2 | Rhamnolipid | 5.50% | 39.8959 | 39.2766 | 0.0450 | 0 |
| 30 | 100 | — | 2 | CI-31 | 0.50% | 39.6087 | 39.5001 | 0.0076 | 0 |
| 31 | 100 | — | 2 | CI-111 | 0.50% | 41.3135 | 41.211 | 0.0072 | 0 |

TABLE IV

5% HCl at 175° F. for 6 hours

| | | | | Metal | Conversion Factor Type | |
|---|---|---|---|---|---|---|
| | | | | 1 | Cr-13 | 0.0703 |
| | | | | 2 | N-80 | 0.0746 |

| Ex. | Volume | KI, mM | Metal | Inhibitor | Conc. | Weights Initial | Final | Corrosion Rate Lbs/Sq Ft | Pitting |
|---|---|---|---|---|---|---|---|---|---|
| Comp 32 | 100 | — | 1 | — | — | 41.779 | 36.9611 | 0.3385 | 0 |
| 33 | 100 | 12.05 | 1 | SC-1000 | 0.50% | 40.228 | 39.681 | 0.0384 | 0 |
| 34 | 100 | 12.05 | 1 | Rhamnolipid | 5.50% | 39.3441 | 39.0146 | 0.0231 | 0 |
| 35 | 100 | — | 1 | CI-27 | 0.20% | 39.4854 | 39.3927 | 0.0065 | 0 |

TABLE V

10% HCl at 175° F. for 6 hours

| | | | | | | | Metal | Conversion Factor Type | |
|---|---|---|---|---|---|---|---|---|---|
| | | | | | | | 1 | Cr-13 | 0.0718 |
| | | | | | | | 2 | N-80 | 0.0732 |
| | | KI, | | | | Weights | | Corrosion Rate | |
| Ex. | Volume | mM | Metal | Inhibitor | Conc. | Initial | Final | Lbs/Sq Ft | Pitting |
| Comp 36 | 100 | — | 1 | — | — | 39.6889 | 33.0116 | 0.4794 | 0 |
| 37 | 100 | 12.05 | 1 | SC-1000 | 1.00% | 39.266 | 38.6229 | 0.0462 | 0 |
| 38 | 100 | 12.05 | 1 | Rhamnolipid | 11.00% | 39.7079 | 39.2642 | 0.0319 | 0 |
| 39 | 100 | — | 1 | CI-27 | 0.20% | 41.1592 | 41.0216 | 0.0099 | 0 |

As demonstrated in each of the tables, by applying the compositions and using the methods described herein, corrosion of various types of metals, such as carbon steel and alloy steel, in aqueous acidic solutions can be controlled. The results demonstrate the effectiveness of the corrosion inhibitors in the current disclosure and the synergistic effect achieved on corrosion inhibition when the corrosion inhibitor intensifier of the present disclosure is utilized. The industry acceptable level for corrosion rates is less than 0.050 lb/ft$^2$ during the life of treatment, i.e., acid contact time. As can be seen, all of the samples that used either the corrosion inhibitor alone at lower temperatures or in combination with the corrosion inhibitor at higher temperatures performed substantially better than the samples without any corrosion inhibitor and corrosion inhibitor intensifier and also substantially better than the acceptable industry standard of less than 0.050 lb/ft$^2$ for regular tubular.

From the foregoing, it will be observed that numerous variations and modifications may be effected without departing from the true spirit and scope of the novel concepts of the disclosure.

What is claimed is:

1. A method of inhibiting corrosion during a well treatment operation which comprises introducing into a well a composition comprising a corrosive inhibiting effective amount of a biosurfactant selected from the group consisting of rhamnolipids, cellobiose lipids, trehalose, lipopolysaccharides, emulsans, alasans and protease enzymes.

2. The method of claim 1, wherein the biosurfactant is a mono-rhamnolipid of formula (I A) or a di-rhamnolipid of formula (I B):

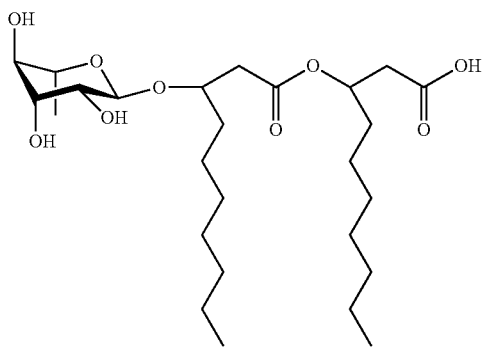
(I A)

-continued

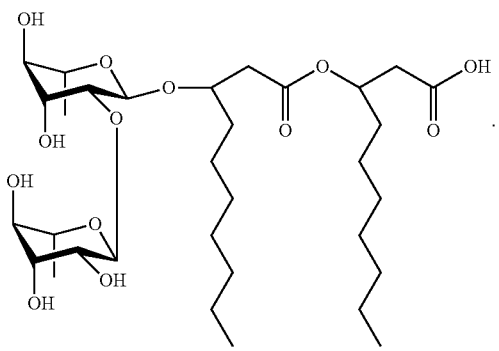
(I B)

3. The method of claim 1, wherein the biosurfactant is a cellobiose lipid of the formula (II):

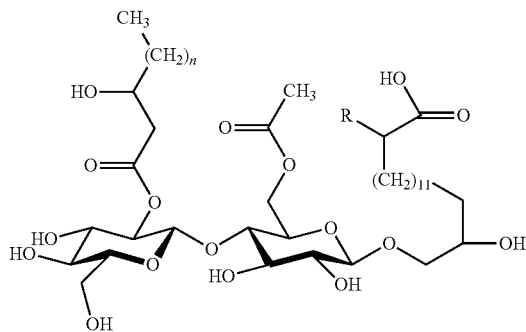
(II)

where R is —H or —OH and n is 2 to 4.

4. The method of claim 1, wherein the biosurfactant is a trehalose of the formula (III):

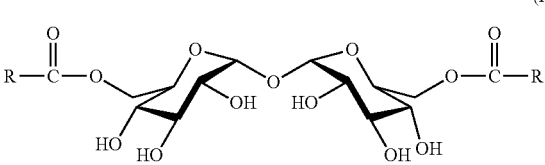
(III)

where RCO is mycoloyl.

5. The method of claim 1, wherein the biosurfactant is an emulsan of formula (IV):

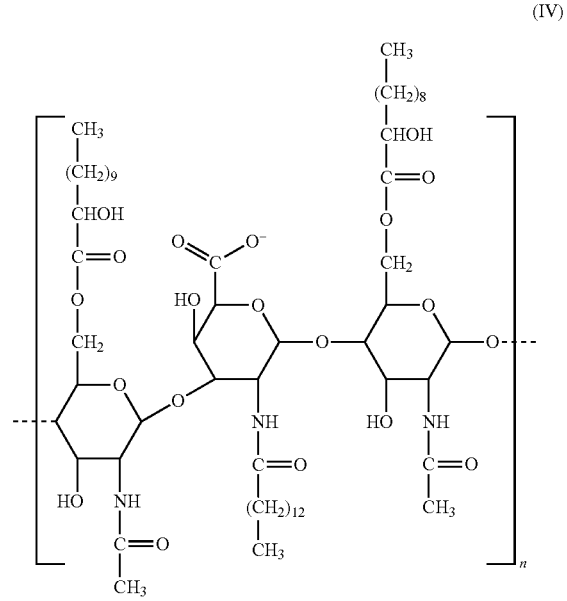

having an approximate molecular weight of 1,000 kDa.

6. The method of claim 1, wherein the biosurfactant is a protease enzyme.

7. The method of claim 1, wherein the composition further comprises a corrosion inhibitor intensifier selected from the group consisting of formic acid, sodium formate, potassium formate, methylformate, ethylformate, sodium iodide, potassium iodide, copper iodide, molecular iodide, metal oxides, and combinations thereof.

8. The method of claim 7, wherein the corrosion inhibitor intensifier is potassium iodide.

9. The method of claim 1, wherein the biosurfactant is a rhamnolipid containing one or two rhamnose units linked glycosidically to a 3-hydroxy acid.

10. The method of claim 1, wherein the biosurfactant is a cellobiose lipid comprising a disaccharide cellobiose linked O-glycosidically to a ω-hydroxyl group of 15,16-dihydroxy-hexadecanoic acid or 2,15,16-trihydroxyhexadecanoic acid.

11. The method of claim 10, wherein the disaccharide cellobiose further has hydroxyl groups esterified either to an acetate or a 3-hydroxy fatty acid.

12. The method of claim 1, wherein the biosurfactant is a trehalose comprising a non-reducing disaccharide having two glucose units linked in an α,α-1,1-glycosidic linkage.

13. The method of claim 1, wherein the biosurfactant is an emulsan consisting of a disaccharide backbone of D-galactosamine, D-galactosaminouronic acid and a deoxyaminohexose to which $C_{10-22}$ fatty acid groups are linked via ester and amide bonds.

14. The method of claim 1, wherein the biosurfactant is a protease enzyme selected from the group consisting of subtilisin, diglycosyl diglycerides and fimbriae.

15. A method of treating an alloy surface during a well treatment operation comprising the step of contacting the alloy surface with a treatment fluid comprising an aqueous acidic fluid and a corrosion inhibitor selected from the group consisting of rhamnolipids, cellobiose lipids, trehalose, lipopolysaccharides, emulsans, alasans and protease enzymes, wherein reduction in corrosion of the alloy surface is greater than when the alloy surface is only contacted with the aqueous acidic fluid.

16. The method of claim 15, wherein the composition further comprises a corrosion inhibitor intensifier selected from the group consisting of formic acid, sodium formate, potassium formate, methylformate, ethylformate, sodium iodide, potassium iodide, copper iodide, molecular iodide, metal oxides, and combinations thereof.

17. The method of claim 16, wherein the corrosion inhibitor intensifier is potassium iodide.

18. A method of inhibiting corrosion of a steel surface in contact with an acidic fluid during a well treatment operation comprising the steps of:
(a) contacting the acidic fluid with a corrosion inhibitor selected from the group consisting of rhamnolipids, cellobiose lipids, trehalose, lipopolysaccharides, emulsans, alasans and protease enzymes; and
(b) contacting the steel surface with the acidic fluid and the corrosion inhibitor.

19. The method of claim 18, wherein the step of contacting the steel surface with the acidic fluid and the corrosion inhibitor comprises pickling a tubular, cleaning a wellbore, matrix acid stimulation, acid fracturing, acid tunneling, scale treatment, coiled tubing application, or damage removal.

20. A composition for use in the acid treatment of wells, comprising:
(a) a corrosion inhibitor comprising a biosurfactant selected from the group consisting of rhamnolipids, cellobiose lipids, trehalose, lipopolysaccharides, emulsans, alasans and protease enzymes; and
(b) corrosion inhibitor intensifier in an acidic solution.

* * * * *